United States Patent Office 3,507,296
Patented Apr. 21, 1970

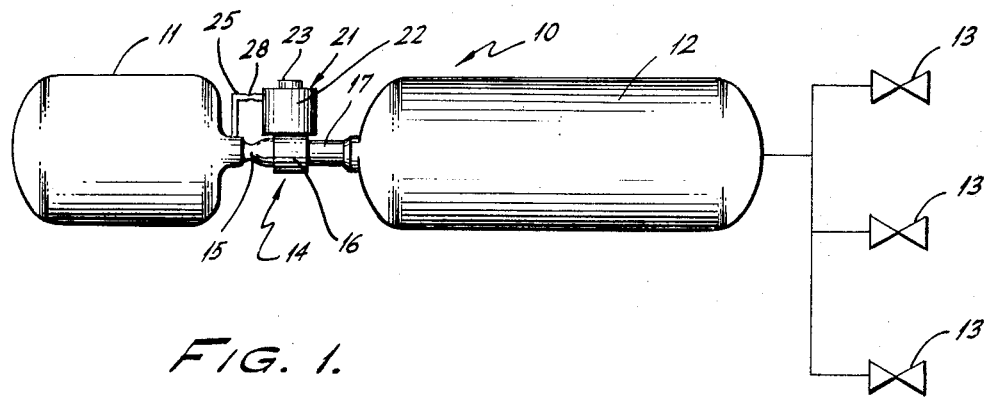
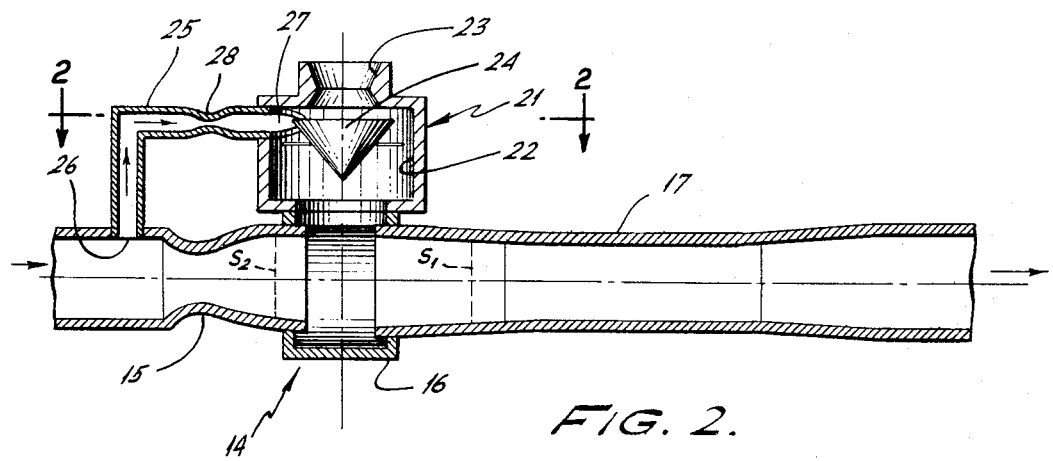
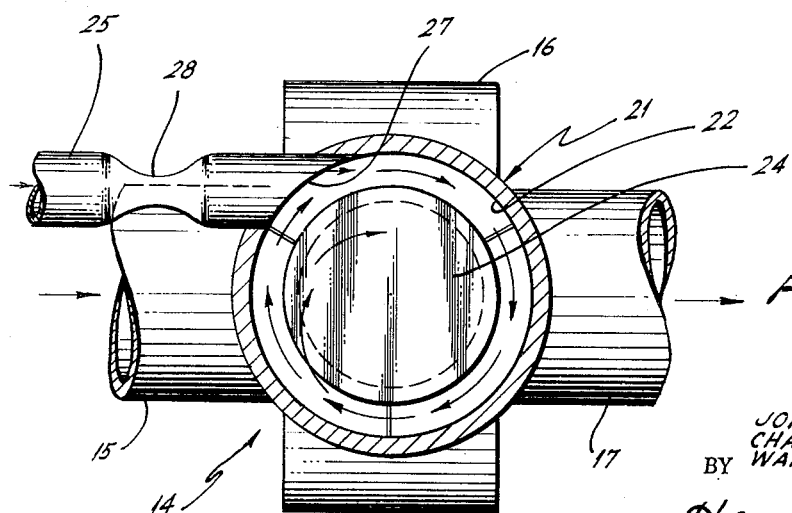

3,507,296
FLUID FLOW CONTROL APPARATUS
John W. Fix, South Laguna, Charles E. Hallum, Newport Beach, and Warren F. Kaufman, Santa Ana, Calif., assignors to Philco-Ford Corporation, Philadelphia, Pa., a corporation of Delaware
Filed June 25, 1968, Ser. No. 739,692
Int. Cl. F15d 1/02; F15c 1/16
U.S. Cl. 137—81.5                              7 Claims

ABSTRACT OF THE DISCLOSURE

Fluid flow control apparatus in which a nozzle discharges a high pressure fluid at supersonic velocity for flow through a supersonic diffuser into a receptacle within which pressure is to be maintained at substantially the pressure recovered in the diffuser. A bleed conduit is connected between the nozzle and the diffuser so that when the desired pressure it attained in the receptacle the shock is driven from the inlet of the diffuser, and downstream of the bleed conduit, to a region downstream of the nozzle but upstream of the bleed conduit. Flow through the bleed conduit is regulated by a vortex fluid amplifier and a nozzle in series fluid flow circuit. The vortex amplifier comprises a conical member having it polar axis aligned with the axis of the bleed flow conduit to form an annular fluid flow region. A conduit supplied from the same high pressure fluid source as the nozzle has its outlet positioned to provide flow of such fluid tangentially with respect to the annular flow whereby to create a vortex controlling such annular flow, and hence the bleed flow.

Cross reference to related disclosure

Fluid flow control apparatus set out in this disclosure presents improvement over fluid flow control apparatus described in copending U.S. patent application Ser. No. 601,679, filed Dec. 14, 1966, entitled "Fluid Flow Control Apparatus," and assigned to the assignee of the present invention.

Background of the invention

This invention relates to fluid flow control apparatus, and is directed especially to improvements in through-flow means for achieving pressure regulation of gaseous fluids.

In the guided missile art, fluid pressurization systems have used mechanically actuated relief valves to bleed hot gases from solid propellant generators to the ambient atmosphere when desired tank pressures are reached. Mechanically actuated valves of course include mechanical linkages whose performance may be adversely affected by the high accelerative loading characteristic of the missile art. It is an objective of the present invention to provide an improved fluid pressure regulator that is of improved efficiency and reliable under conditions of extreme acceleration.

It is a further general objective of the invention to provide a fluid pressure regulator that is reliable under the aforesaid conditions, and requires no moving parts.

Summary of the invention

In accordance with the above-mentioned earlier disclosure, the apparatus embodying the present invention includes the combination of a nozzle for receiving fluid under relatively high pressure and for discharging the same at supersonic velocity, with a supersonic diffuser disposed downstream of the nozzle and in spaced relation thereto. Duct means interconnects the nozzle and the diffuser, and a bleed conduit communicates with the duct means in a region thereof intermediate the nozzle and the diffuser. The apparatus results in formation of a shock wave movable between the region of the inlet to the diffuser and the region of the outlet of the nozzle, in response to changes in fluid pressure at the outlet of the diffuser. The construction and arrangement is such that virtually all the fluid flows through the diffuser when the shock wave is in the region of the diffuser inlet, while a substantial part of the fluid flows through the bleed conduit when the shock wave is positioned in the region of the nozzle outlet. In this way, substantially constant pressure at the diffuser outlet is achieved. In particular accordance with the present invention, and to improve the efficiency of controlling the bleed flow, a vortex fluid flow amplifier is disposed in the bleed conduit for decreasing the rate of bleed gas flow when there is low flow through the bleed conduit. Control flow is derived from the same high pressure gas generator, from a region upstream of the supersonic nozzle.

For a more complete understanding of the invention, reference is made to the following description taken in light of the accompanying drawing.

Brief description of the drawing

FIGURE 1 is a diagrammatic showing of apparatus embodying the invention;

FIGURE 2 is a detailed sectional view of a portion of the apparatus illustrated in FIGURE 1; and FIGURE 3 is a sectional view of a portion of the apparatus shown in FIGURE 2, on a slightly larger scale, and as seen locking generally in the direction of arrows 2—2 applied thereto.

DESCRIPTION OF THE PREFERRED EMBODIMENT

With more detailed reference to the drawing, and first to FIGURE 1, there is illustrated a demand pressurization system 10 in which the present invention has particular utility. Gaseous fluid from a gas generator 11 operating at very high pressure enters a pressure regulator 14 embodying the invention and is fed to a hydraulic-pneumatic accumulator 12. The liquid side of accumulator 12 is connected to an array of liquid injector valves 13, each subject to being opened and closed at different times, by known means, in accordance with demands of components (not shown) with which they are associated.

With reference further to FIGURES 2 and 3, pressure regulator 14 comprises a primary nozzle 15 fed by a gas generator 11. An annular duct 16 is provided downstream of nozzle 15 and interconnects the latter with a supersonic diffuser 17, or pressure recovery tube, which in turn is connected to accumulator 12.

A bleed gas conduit 21 is connected with duct 16 as shown, and comprises a vortex chamber 22 in series flow circuit with a bleed gas nozzle 23. Chamber 22 has a conical member 24 concentric therewith to provide an annular flow path for gas. A vortex inducing conduit 25 is provided with an inlet port 26 fed by generator 11 and a tangential outlet port 27 at about the region of the base portion of cone 24. A nozzle 28 in conduit 25 increases the velocity in said conduit, and further aids in control of gas flow therethrough by limiting the quantity of control gas flow.

In operation, gas from generator 11 is accelerated to sonic velocity in the throat of supersonic nozzle 15. The gaseous fluid is then expanded to supersonic velocity, reaching a maximum in the region of the entrance to supersonic diffuser 17, the pressure recovery element. The lower operational pressure level of regulator 14 is established when the pressure in accumulator 12 matches the design total pressure recovery of supersonic diffuser 17. A slight increase in accumulator pressure above the design level drives the shock wave established in the region $S_1$ of the entrance of diffuser 17 to a region $S_2$ upstream of both the annular bleed conduit 16 and the entrance to the diffuser. A resulting increase in static pressure at the entrance to bleed conduit 21 causes a greater percentage, or all of, the total flow to pass through bleed gas nozzle 23, depending upon the flow demand from the outlet of the regulator.

As control gas supplied from generator 11 flows through conduit 25 and its nozzle 28, and is injected tangentially from port 27 into chamber 22, its momentum induces rotation within the chamber (see arrows indicative of gas flow in FIGURE 3). This rotation causes a vortex to be generated in the region of annular flow occurring at the base of cone 24 and confined by said base and the inner wall of generally cylindrical chamber 22. The rapidly swirling gas in the vortex, by virtue of centrifugal forces induced therein, tends to effect substantially uniform stagnation pressure in the region of annular bleed flow, accompanied by low static pressure near the axis of bleed nozzle 23. The net result is markedly reduced flow from annular conduit 16 through bleed nozzle 23, so long as the vortex action exists. Advantageously, bleed gas flow, which normally would leak through nozzle 23 when the pneumatic regulator outlet pressure is less than the design pressure regulation range (i.e. shock at $S_1$), instead is diverted for flow through the regulator into accumulator 12.

When the bleed gas flow is much greater than the control gas flow, as is the case when the regulator outlet pressure is greater than the design pressure regulation range (i.e. shock at $S_2$), there is little vortex action. Accordingly, pressure immediately upstream of bleed gas nozzle 23 attains a value essentially equal to that in the annular bleed port 16.

In the regulator of the present invention, the bleed gas leakage flow rate advantageously is minimized, when there is appreciable demand on the regulator, as compared with the flow rate in similar regulators not equipped with such vortex control. Moreover, since there are no moving parts, response to the regulator is rapid over wide ranges of acceleration as well as vibration.

We claim:

1. In fluid pressure control apparatus comprising, a nozzle for receiving fluid under relatively high pressure and for discharging the same at supersonic velocity, fluid conduit means through which said fluid flows as it is discharged by said nozzle, receiver means for receiving fluid from said conduit means and within which said fluid is to be maintained at a predetermined pressure, and bleed conduit means connected to said fluid conduit means, the improvment which consists in the provision of means defining a vortex fluid amplifier in series flow circuit with said bleed conduit means, the above recited elements being so cooperably disposed and arranged that under conditions of higher pressure in said container means, fluid is caused to flow through said conduit means at a velocity such that at least a portion of the fluid does not carry past said bleed conduit means and flows therethrough, and under conditions of lower pressure in said receiver means, fluid fed to said nozzle is caused to flow through said conduit means at a velocity sufficient to carry substantial portions thereof past said bleed conduit means and into said receiver means, said vortex fluid amplifier being operable further to ensure reduced flow through said bleed conduit means under conditions of substantial flow through said conduit means into said receiver means, whereby fluid is maintained in said receiver means at predetermined pressure.

2. Fluid pressure control apparatus according to claim 1, and characterized in that said bleed conduit means comprises: an annular passage disposed about said fluid conduit means; and bleed nozzle means leading from said annular passage.

3. Fluid pressure control apparatus according to claim 2, and further characterized in that said vortex fluid amplifier comprises a generally cylindrical conduit in series fluid flow circuit with said annular passage and said bleed nozzle means, a conical member having its polar axis aligned with the axis of said cylindrical conduit whereby to form a generally annular fluid flow region, and control conduit means for receiving a portion of the recited fluid under high pressure and having an outlet positioned to provide discharge of such fluid tangentially with respect to the annular flow path whereby to create a fluid vortex controlling such annular flow, and hence the flow through said bleed nozzle.

4. Fluid pressure control apparatus according to claim 3, and further characterized by the inclusion of fluid flow control means for said control conduit means.

5. Apparatus for regulating gaseous pressure in receiver means and fed thereto from a source of high pressure, comprising: a nozzle for discharging gas under pressure at supersonic velocity; a supersonic diffuser disposed downstream of said nozzle, in spaced relation thereto, and adapted to direct gas into such receiver means to be maintained at a predetermined pressure level; duct means interconnecting said nozzle and said diffuser; bleed conduit means communicating with said duct means in a region thereof intermediate said nozzle and said diffuser, said duct means, said nozzle and said diffuser being cooperable, in the presence of supersonic gas, to form a shock wave movable between the region of the inlet to said diffuser and the region of the outlet of said nozzle, in response to changes in gas pressure at the outlet of said diffuser and corresponding to pressures in such receiver means, substantially all gas caused to flow through the diffuser when the shock wave is positioned in the region of the inlet of the diffuser, and to flow through the bleed conduit means when the wave is positioned in the region of the outlet of the nozzle; and means defining a vortex fluid amplifier in series flow circuit with said bleed conduit means, operable to ensure minimal flow through the latter means under conditions of substantial flow through said diffuser.

6. Apparatus according to claim 5, and characterized in that said duct means comprises an annular passage disposed about and interconnecting said nozzle and said diffuser, and by the inclusion of bleed nozzle means in fluid flow communication with said annular passage, said nozzle means and said annular passage comprising said bleed conduit means in series fluid flow circuit with said vortex fluid amplifier.

7. Apparatus according to claim 5, and further characterized in that said vortex fluid amplifier comprises a generally cylindrical conduit through which bleed gas is caused to flow, a conical member having its polar axis aligned with the axis of said cylindrical conduit whereby to form a generally annular gas flow region, and control conduit means for receiving a portion of the gas from the source of high pressure and having an outlet positioned to provide discharge of such gas tangentially with respect to the annular gas flow path, whereby to create a gas vortex controlling such annular flow, and hence the flow through said bleed conduit means.

References Cited

UNITED STATES PATENTS

| 3,219,048 | 11/1965 | Palmisano | 137—81.5 |
| 3,410,287 | 11/1968 | Van Der Heyden et al. | 137—81.5 |
| 3,424,182 | 1/1969 | Mayer | 137—81.5 |
| 3,447,383 | 6/1969 | Camarata | 137—81.5 X |
| 3,456,667 | 7/1969 | Mayer | 137—81.5 |

M. CARY NELSON, Primary Examiner

W. R. CLINE, Assistant Examiner